United States Patent [19]

Tomen

[11] 4,326,730
[45] * Apr. 27, 1982

[54] QUICK TRANSFER TOW BAR

[76] Inventor: Dan Tomen, 86 Paddock Green Cres., London, Ontario, Canada, N6J 3P7

[*] Notice: The portion of the term of this patent subsequent to Apr. 8, 1997, has been disclaimed.

[21] Appl. No.: 102,406

[22] Filed: Dec. 11, 1979

Related U.S. Application Data

[63] Continuation-in-part of Ser. No. 906,976, May 17, 1978, Pat. No. 4,196,919.

[51] Int. Cl.³ .............................................. B60D 1/00
[52] U.S. Cl. ................................. 280/502; 280/491 R
[58] Field of Search ........... 280/415 R, 415 A, 491 R, 280/491 E, 502, 505, 456 R, 460 R

[56] References Cited

U.S. PATENT DOCUMENTS

| | | | |
|---|---|---|---|
| 2,673,095 | 3/1954 | Fulton | 280/502 |
| 2,859,050 | 11/1958 | Stonerock | 280/491 E |
| 3,113,789 | 12/1963 | Safford | 280/502 |
| 3,220,749 | 11/1965 | Mathisen | 280/503 |
| 3,481,630 | 12/1969 | Parkhurst | 280/502 |
| 3,510,146 | 5/1970 | Hartman | 280/491 E |
| 3,590,236 | 6/1971 | Ussery | 280/502 |
| 3,806,162 | 4/1974 | Milner | 280/502 |
| 4,047,734 | 9/1977 | Miles | 280/495 |
| 4,196,919 | 4/1980 | Tomen | 280/502 |

*Primary Examiner*—John P. Silverstrim
*Attorney, Agent, or Firm*—Irvin A. Lavine

[57] ABSTRACT

A hitch is disclosed which readily attaches itself via hitch assemblies to the bumper of an automobile and simultaneously secures the cross bar or draft bar of the hitch in a manner which requires no threading devices to obtain the securing action. In fact the securing action is by the simple movement of a lever into an over centered position on the hitch assembly and this in cooperation with two chains thereof, one attached to the upper margin and the other attached to the lower margin of the bumper or possibly the frame of the car securingly clasps not only the hitch assembly to the bumper but the draft bar to the hitch assembly. Preferably, two hitch assemblies are provided one located near each end of the cross or draft bar. Thus with "snaps" of each lever into over center position the bumper hitch is secured to the automobile awaiting for connection of the trailer tow bar thereof for coupling to an awaiting trailer.

The draft bar can provide attachment fixtures at either end for the attachment of a tow bar assembly. The hitch may then be mounted on the front bumper of a disabled automobile, the tow bar assembly attached to the attachment fixtures of the draft bar to form a tow bar. The disabled automobile may then be towed away.

9 Claims, 17 Drawing Figures

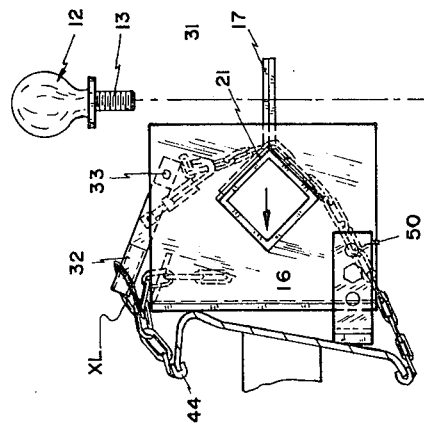
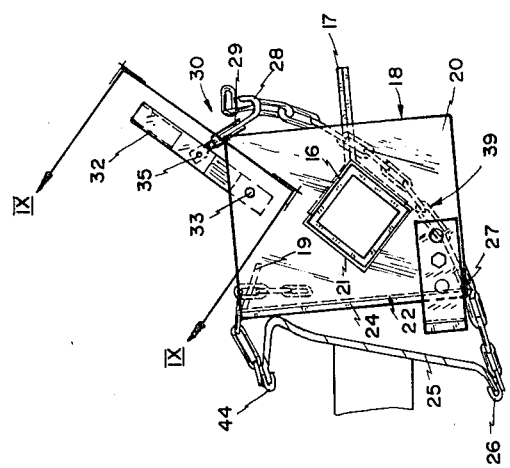
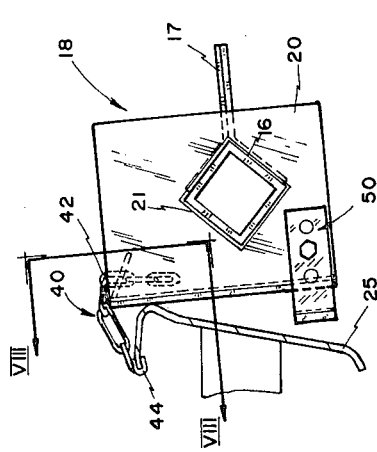
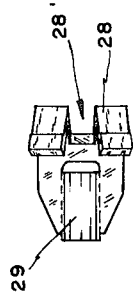
FIG. 3
FIG. 4
FIG. 5
FIG. 6
FIG. 7

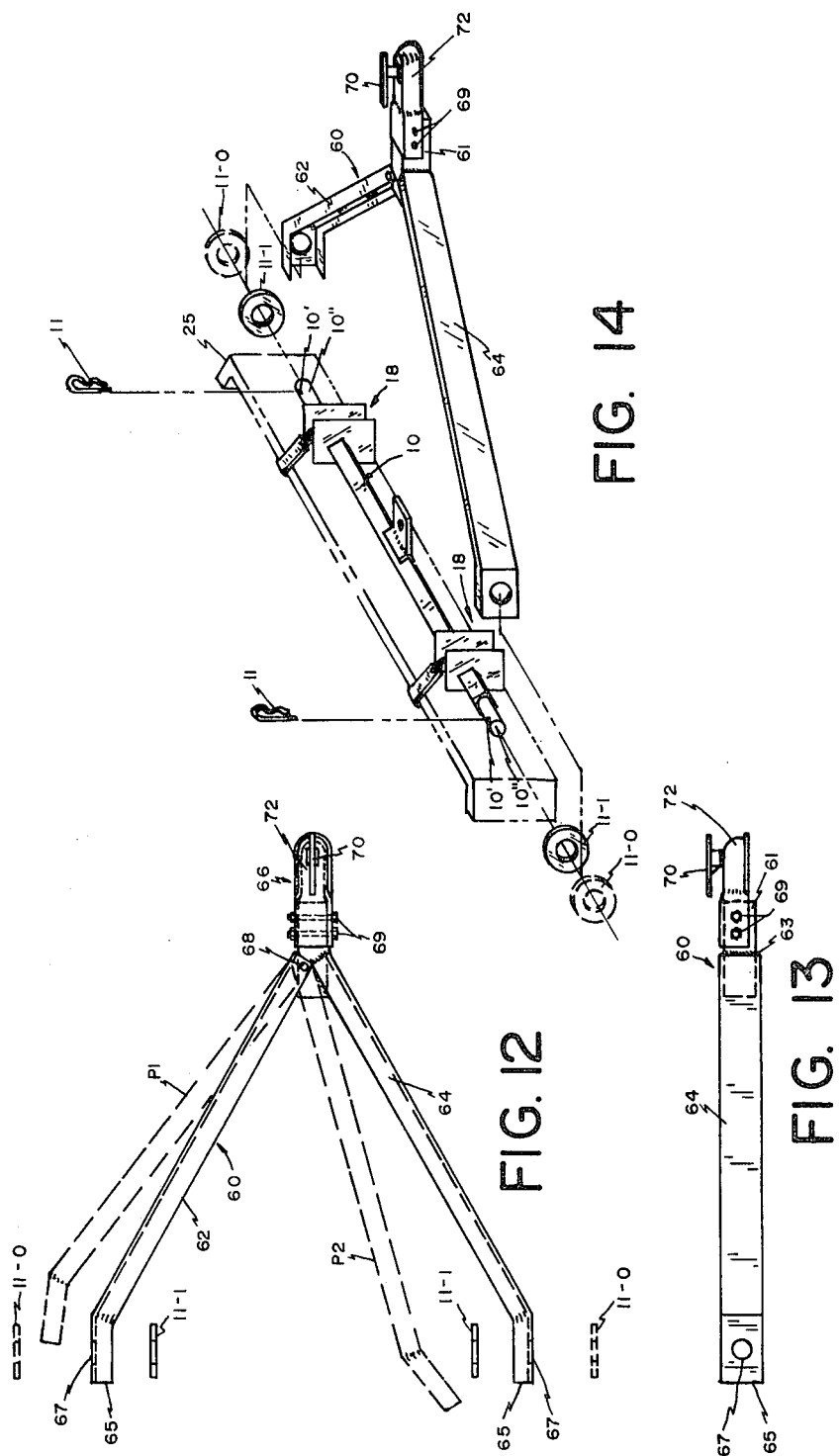

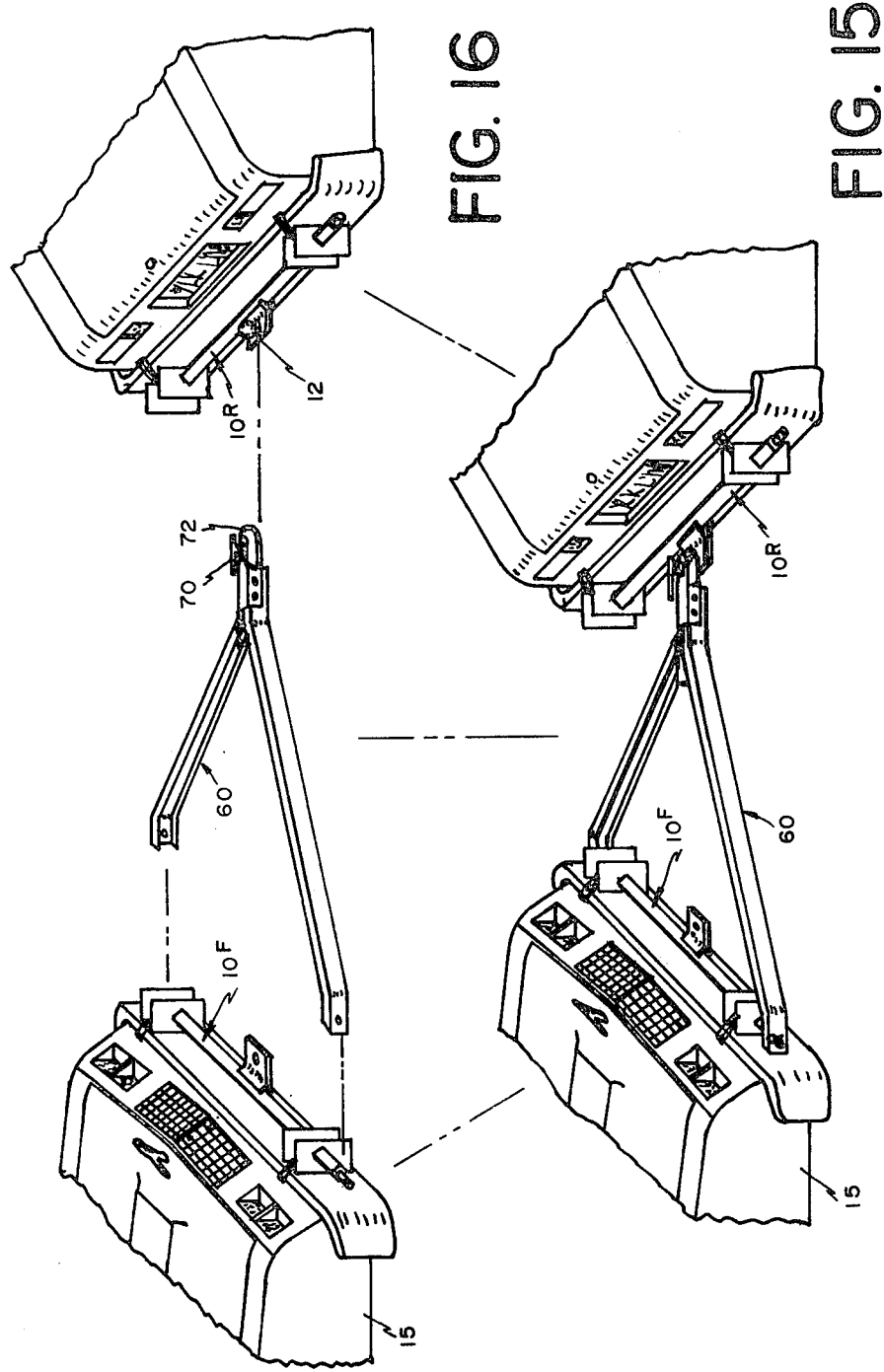

QUICK TRANSFER TOW BAR

This is a continuation-in-part application of Ser. No. 906,976 filed May 17, 1978, now U.S. Pat. No. 4,196,919.

This invention relates to a bumper hitch for towing attachments and in particular to a quick means for mounting and removing a trailer hitch attachment from a bumper and the like.

In a preferred embodiment the bumper hitch can be mounted on the front bumper of a car and with an auxilary two bar which removably attaches to it s disabled vehicle may be pulled from its front.

A number of trailer hitches exist in the prior art which, on the one hand, attach themselves to a rear bumper of an automobile and thus provide an element, generally a ball, for attachment of towing bars and the like.

A species of such bumper hitches consists of a cross bar carrying a towing element mounted in its mid section, a pair of hitch assemblies connect to the ends of the said bar. Various variations for the actual connection means of the cross bar to the hitch assemblies have been disclosed as have been alternative means of attachment of the hitch assemblies to the bumper. All suffer from complicated mechanical arrangements either requiring the fixing of the cross bar in the hitch assembly prior to mounting of the assembly onto the bumper, or the securing of the hitch assembly to the bumper by threaded devices such as nuts and bolts including wing nuts. Some have features, however, which allow the adjustment of a towing element (ball) so as to accomodate various differentials in elevation between the bumper and the trailer towing bar.

I have conceived of a novel hitch assembly which attaches itself to either the front or back bumper and simultaneously secures the cross bar, or draft bar, to the hitch assembly in a manner which requires a no threading devices to obtain this securing action. This is achieved by the simple movement of a lever into an over-centre position on the hitch assembly and this in cooperation with two chains, one attached to the upper margin and the other attached to the lower margin of the bumper or to the frame, securely clasps not only the hitch assembly to the bumper but the cross bar to the hitchassembly. Thus with two "snaps" the bumper hitch is secured. When used on the rear bumper the hitch awaits connection of the trailer tow bar onto the coupling element of the bumper hitch. When used in the front bumper with an auxilary tow bar assembly the hitch and assembly act as a vehicle tow bar.

Quick release for removal and adjustment is achieved by moving the lever from its over-centre position to its relaxed position.

In order to accomodate various forms of bumper a small adjusting screw is provided to the over-centre lever so as to regulate the distance that the lower chain may travel.

The invention therefore contemplates a tow bar comprising a hitch and a tow bar assembly in combination:

(a) the hitch adapted for attachment to a bumper of a motor vehicle, the hitch including a draft bar wherein the improvement comprises an extended draft bar having fixtures at either end, and hitch assemblies for mounting the draft bar near each of its ends to the vehicle bumper wherein the hitch assembly comprises:

(i) a generally elongated U shaped member including an essentially flat spine adapted to rest in facing relationship against said bumper, and a pair of parallel arms extending from said spine in a direction away from said bumper, each of said arms having an aperture therethrough for receiving the ends of said draft bar;

(ii) two adjacent finger members mounted at the upper regions of the U shaped member to define between them and the spine an open slit that extends from the spine toward the distal ends, said slit adapted to accept a link of a chain;

(iii) a lever member having a first and a second end; means for pivotally attaching said first end to upper distal regions of said arms whereby said second end swings in a plane between said arms and parallel thereto from a lower position below and beyond the distal ends of said arms to an upper position above the upper edge of said spine; a depending member pivotally mounted on said lever member between said second end and said pivotally attaching means, said depending member having a slot therein;

(iv) upper and lower chains, each chain having attachment means at one end adapted for respective engagement with the automobile, the upper chain adapted to have one link mate into the upper slit, the lower chain having one of its links adapted to enter into said slot whereby on movement of the lever member from its lowest to its upper position the lower chain is caused to be pulled tight and to enwrap the draft bar and to urge the draft bar toward the spine, and into binding engagement with segments of each arm which define in part the aperture;

(b) the tow bar assembly including a first straight piece with distal and proximate ends, means on the distal end for rigid attachment to one of said fixtures, a second straight piece with distal and proximate ends, and means for affixing the proximate ends of both straight pieces together and means on the distal end of the second straight piece for rigid attachment to said other fixture, and trailer hitch attachment means near the proximate ends adapted for attachment to another trailer hitch.

The invention will now be described by way of example and reference to the accompanying drawings in which:

FIGS. 3 through 5 are side elevations to the hitch of FIG. 2 in various stages of assembly.

FIG. 6 is an exploded side view of a pivoting pair of fingers associated with the hitch assembly.

FIG. 7 is a plan view of the finger member of FIG. 6.

Figure 8:
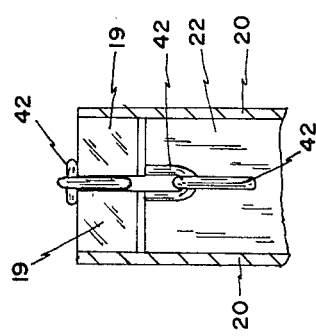
Figure 9:
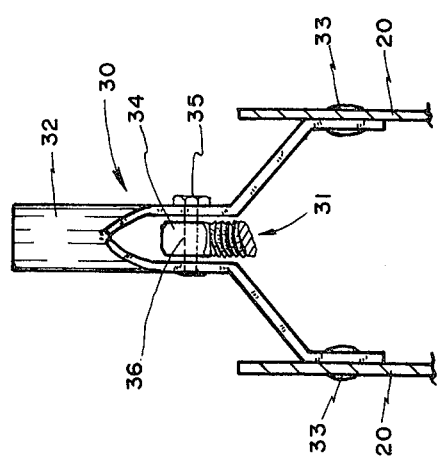

FIGS. 8 and 9, located with finger 1, are respectively sections along VIII—VIII and IX—IX of FIGS. 3 and 4.

Figure 2:
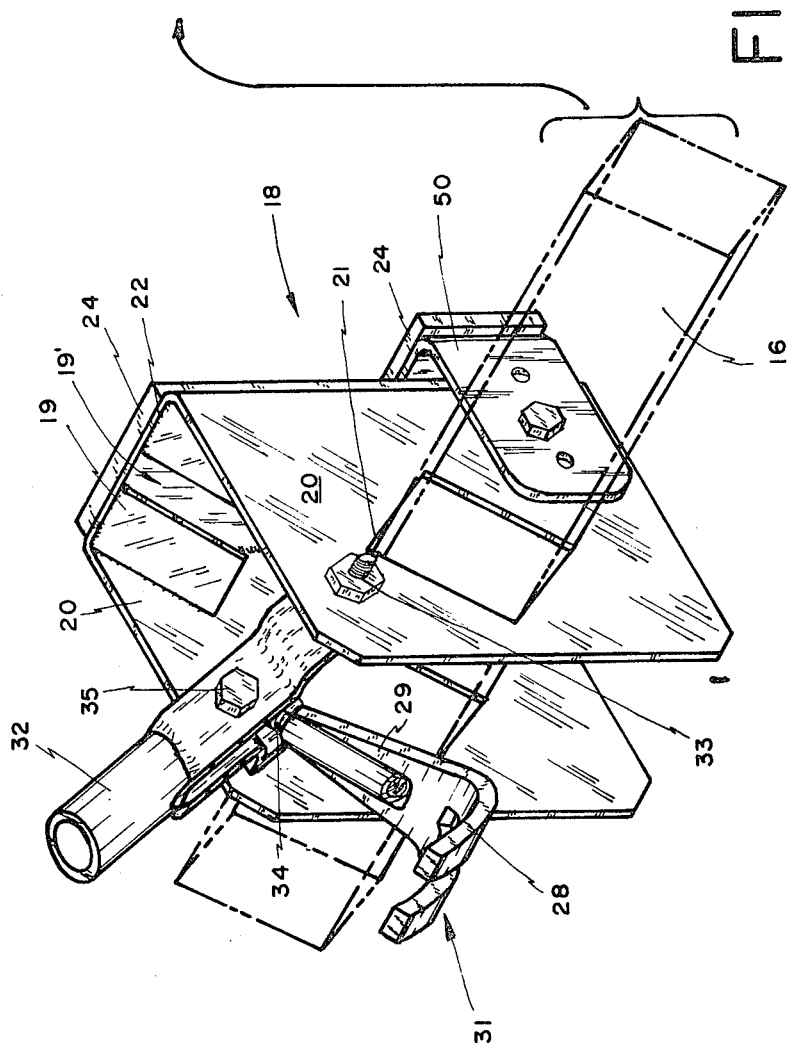
FIG. 2 is a perspective of the novel hitch assembly of FIG. 1.
Figure 10:
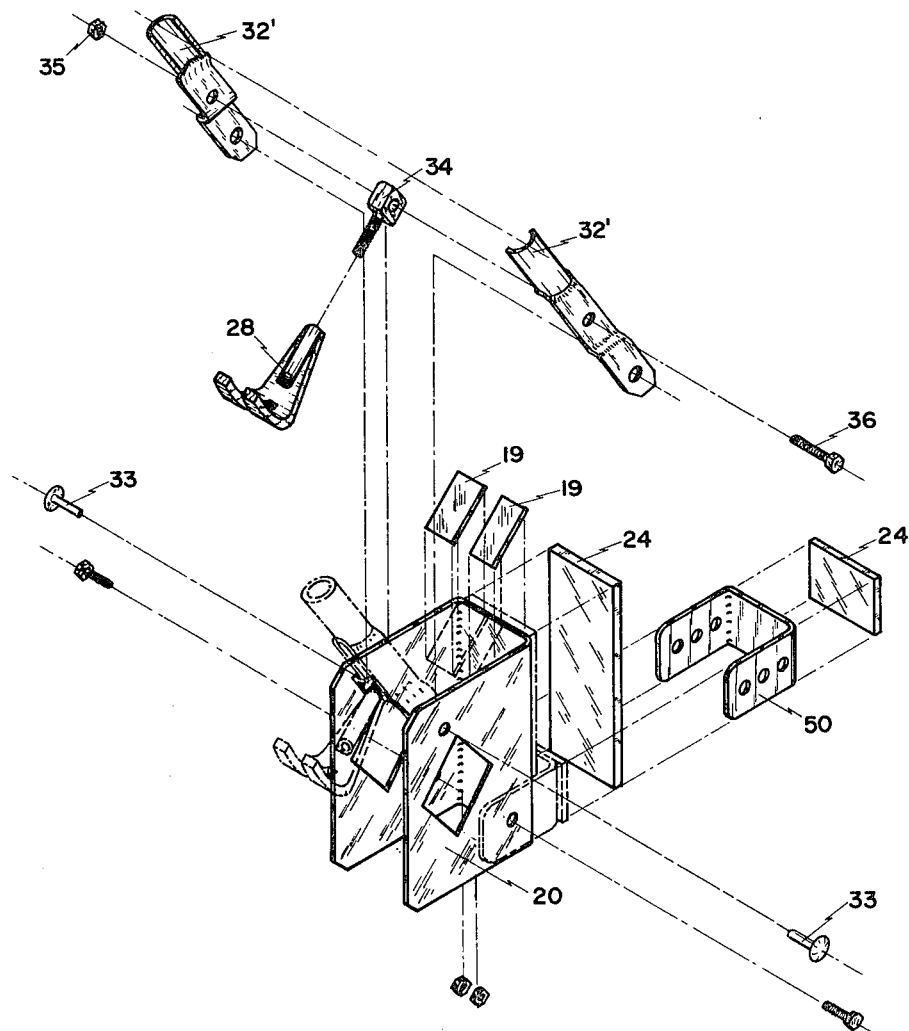

FIG. 10 is an assembly view of the hitch assembly of FIG. 2.

Figure 11:
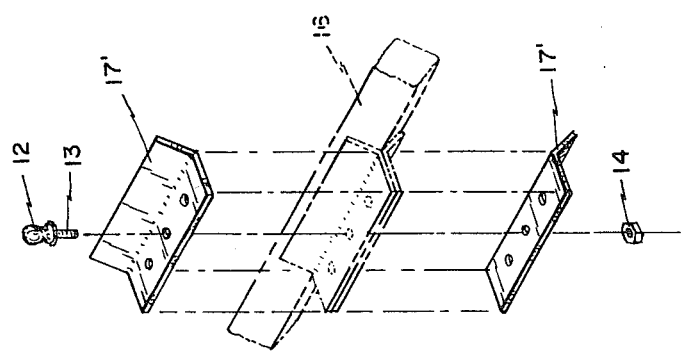

FIG. 11, located with FIG. 2, is a broken assembly of the centre portion of the draft bar.

FIG. 12 is a plan view showing in fanthom the position of the articulating straight piece.

FIG. 13 is an elevational view of the tow bar assembly.

FIG. 14 is an assembly drawing of the draft bar assembly and fixtures of the draft bar prior to assembly into a tow bar.

FIGS. 15 and 16 are views showing the tow bar prior to installation and on installation, in which the towing vehicle uses a trailer hitch as described in this disclosure and in FIGS. 1 through 10, and the towed vehicle uses the same hitch but mounted on its front bumper together with a tow bar assembly attached to the draft bar.

Figure 17:
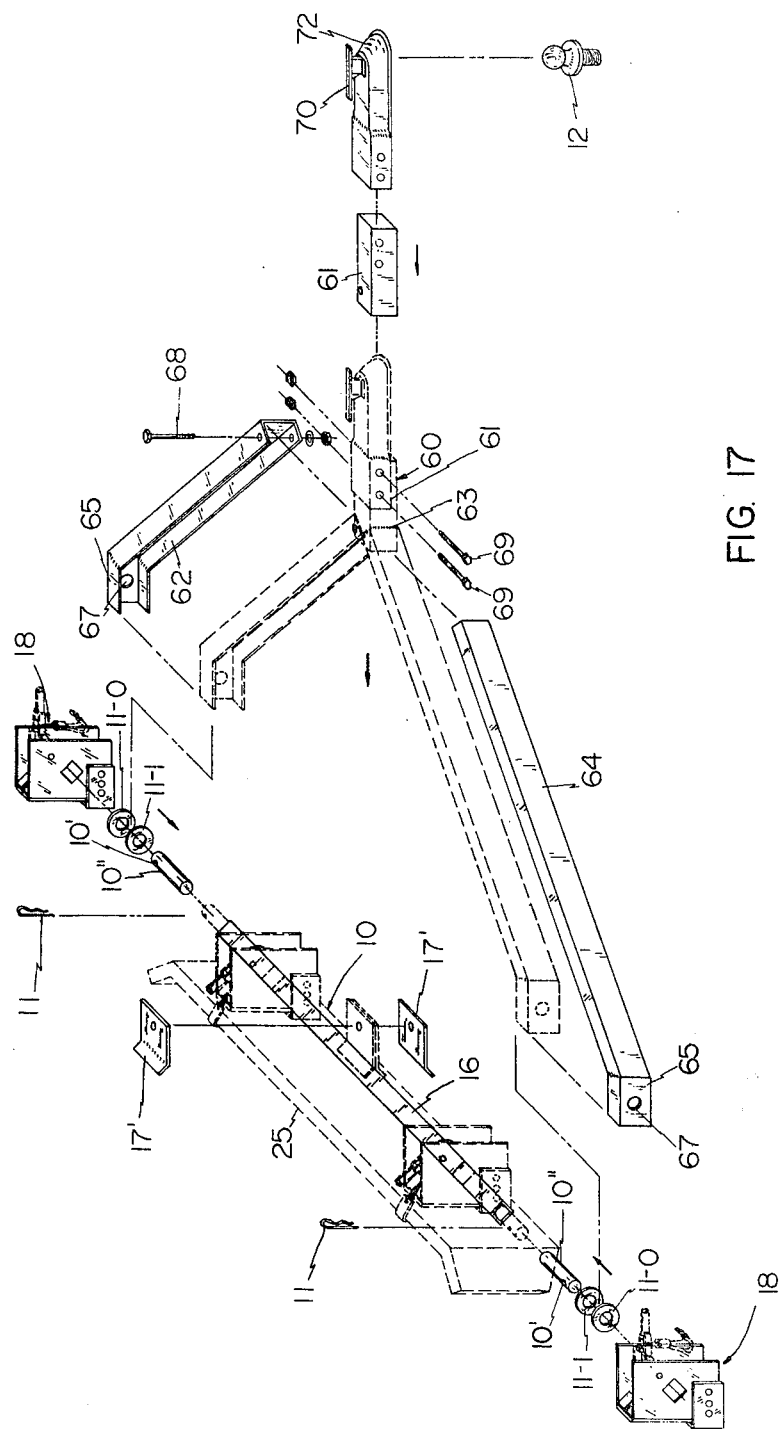

FIG. 17 is an assembly view of the tow bar comprising tow bar assembly draft bar and hitch assemblies.

Figure 1:
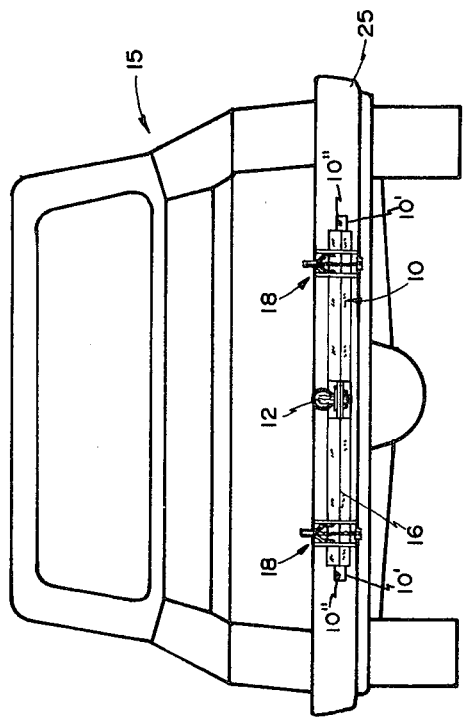
FIG. 1 is a plan view of a hitch incorporating embodiments of the invention.

Referring to FIG. 1 a bumper hitch 10 includes a horizontal draft bar 16 generally formed from sheet material into a hollow square cross sectional member, a centrally mounted towing element 12 generally in the form of a ball tow, and laterally mounted hitch assemblies 18 which on the one hand grasp the draft bar and on the otherhand the rear bumper 25 of the vehicle 15. The draft bar 16, in order to accommodate the towing element 12, has centrally located thereon a support flange 17. Referring to FIG. 5, the ball element 12 has a threaded shaft 13 which is adapted to extend through an aperture in the flange 17, not clearly seen, so as to allow bolt 14 to secure the tow element onto the draft bar 16.

The draft bar 16 extends at its ends into fixtures 10' for removable attachment of a tow bar assembly 60 (FIG. 12). Preferably the fixtures 10' are hollow cylindrical shafts with an aperture 10'' that accommodates a hair pin 11'' to retain distal ends of the tow bar assembly 60 onto the ends of the draft bar 16. Rather than further discussing the tow bar assembly 60, the hitch assembly 18 will be discussed.

The hitch assembly 18 consists of a generally elongated U shaped member with a flat spine 22 which extends into parallel and elongated arms 20. Each arm 20 defines an aperture 21 which is slightly larger in area and dimension than that of the draft bar 16. This is clearly seen in FIGS. 2 through 5, and as such allows the draft bar ends to be easily inserted through both arms of each assembly. A cushion pad 24, of resilient material, such as sponge rubber, is provided on the face of the spine 22 to provide a cushion between the spine and bumper when the assembly is mounted on the bumper. On the obverse face of the spine 22 and at the upper margin thereof are welded two inclined flat members 19 which act as fingers defining a slit 19' therebetween. The slit 19' is sized to accomodate a link 42 of an upper chain 40 which at one end has a hook 44 that engages over the upper margin of the bumper 25. It as easily could attach itself to the automobile body.

Preferably the fingers 19 are flat pieces and are inclined from the upper margin of the spine toward the center of each arm and hence toward the aperture 21—see FIGS. 3 through 5. The fingers are welded to the spine and along another margin to each arm so as to be welded to the U shaped member along two margins of each flat finger. This arrangement adds substantial strength to the U shaped member.

A pivoting lever member 30 is provided with pivoting mounts 33 attached to each arm near the upper and distal region of each arm substantially as shown. The lever member 30 converges from the pivots 33 to extend as solid straight piece and to define at its free end an effort region 32. Between effort region 32 and pivots 33, which act as the fulcrum for the lever, a depending and pivoting finger member 31 is mounted. This depending finger member 31 includes a lower dual finger plate or member 28 that defines therein an accomodating slot 28' for a link 27 of lower chain 39 which has at one end a hook 26 that engages the lower margin of the bumper 25 clearly as seen in FIGS. 4 and 7 or could likewise be connected to the automobile undercarriage if convenient.

The finger member 28 also has an integral threaded receiving socket 29 that is adapted to matingly thread onto shaft 34 that has as its outer end a pivotal attachement (aperture 36), to the load of the lever member 30 as by nut and bolt arrangement 35 extending through the lever 30 and passing through the aperture 36 in the shaft 34. This is clearly seen in FIGS. 6 and 9.

Referring to FIGS. 3 through 5 assembly of the device takes places as follows.

Firstly, the upper chain 40 is mounted; a link thereof 42 is inserted into the upper finger slit 19' and the hook 44 thereof engaged over the upper margin of the bumper 25 all as shown in FIG. 3. The lower chain, generally indicated as 39 is then mounted. Firstly a link 27 thereof is placed into the slot 28' of the pivoting finger member 28. The lower hook 26 is then engaged onto the lower margin of the bumper 25. The draft bar having been inserted into the aperture 21 the lever 30 is moved from the position of FIG. 4 into the position of FIG. 5. With this action the load point moves from being positioned to the right of the fulcrum 33 to the left of the fulcrum 33 pulling the lower chain 39 as to enwrap the chain against the draft bar 16 as clearly seen in FIG. 5 and to cause the draft bar 16 to move and to bind against those marginal segments margins of the aperture 21 that are most proximate the spine 22. By this concerted action the lever not only secures the assembly to the bumper 25 but the draft bar 16 to the assembly 18 with a single snap of each lever.

For fine adjustment of the effective length of the lower chain the relative distance between slot 28 prime and the load 35 can be minutely changed over a preferred range of distance of approximately one chain length, since the pivoting member 31 attaching to the load point is provided with the threaded shaft 34 and the mating socket 29 which readily changes these distances.

A lower U shaped support bracket 50 may be optionally provided in order to align the hitch assembly into a vertical plane relative to the bumper when the bumper has its lower face more recessed than its upper face substantially, as shown in FIGS. 3 through 5. The lower U bracket 50 has a cushion pad 24 along its spine face and the arms thereof are provided with three apertures 52 for adjustment by means of a nut and bolt arrangement 55 that extend through one of these apertures 52 and a corresponding aperture in the arms. Clearly, therefore, the arms 20 of the assembly members 18, therefore must have an accommodating aperture, not shown, in the lower proximate regions thereof in order to accomodate the nut and bolt arrangement 55 and securement of lower U shape support member. In applications where the bumper does not have a profile such that the lower margin is more recessed than the upper margin the support brack is unnecessary.

In certain applications it is desired to have a safety device to hold the lever 30 in the closed position of FIG. 5. This can readily be accommodated by an extra link XL looped through one of the links of the upper chain 40; see FIG. 5, and over the effort region 32 of the lever. If desired the extra link XL may be a removable ring with ends spaced apart but overlapping so it can be turned into that particular chain link desired so that it can be positionally inserted into any desired chain link and then looped as shown in FIG. 5 over the effort 32 of the lever.

Now as to the tow bar assembly 60, when that assembly is affixed onto the ends of the draft bar 60 and the hitch assemblies 18 engaged over a bumper, all as shown in the assembly FIG. 14, a tow bar 70 for pulling a vehicle is created. Thus, the tow bar assembly 60 includes two straight pieces 62 and 64 each which terminates at its distal end as a dogleg that defines an aperture 66. The dogleg may be conveniently defined as an end plate 65. The aperture 66, in the end plate 65, is sized to accommodate the cylindrical sleeve 10″ protruding from the end of the draft bar 16 and hence will slide over the same. Washers 11-I, 11-O slide over the sleeve 10′ and are secured by a hair pin 11 that is placed to extend through the aperture 10′ and to retain the distal end on the draft bar 16. This is clearly seen in FIGS. 15 and 17.

The proximate ends of the straight pieces 62 and 64 merge into or attach to a support piece 61. One of the straight pieces 64 is rigidly attached to the piece 61 as by welding at 63 or by other convenient means, while the other straight piece 62 is pivoted thereon as via a bolt 68 that extends through them, so that the straight piece 62 may swing to assume any of the positions depicted in FIG. 12 including the two fathom positions P1 and P2. In position P2 the straight piece 62 of the tow bar assembly 60 is clasped so that it may be readily stowed. In position P1, the straight piece 62, is positioned so as to display a distance between its distal ends that is greater than the length of the draft bar 16, inclusive of the sleeves 10″, so as to allow the end plates 65 to slide over the protruding cylindrical sleeves 10″. Note that the end plates 65 are preferably obtusely positioned (or doglegged) relative to the longitudinal axis of each of the straight pieces 62 and 64. This allows the distal end straight pieces 65 to rest square on the draft bar ends when on the sleeves 10″. On the support bracket 61 there is mounted a conventional coupling assembly 72 with means 70 allowing removable engagement of the coupling assembly 72 over a conventional towing element or ball 12. The coupling assembly 72 is conventionally secured to the support piece 61 as by bolts 69.

Referring to FIGS. 15 and 16 two bumper hitches 10 are shown, 10F on the front bumper of a disabled vehicle 15 and 10R on the rear bumper of a vehicle, 15′. The tow bar assembly 60 is interpositioned between them so that the distal ends of the straight pieces 62 and 64 engage over the cylindrical sleeves 10″ of the front hitch assembly 10F. The hair pins 11 are engaged after the washers 11-I and 11-O are in place and the coupling assembly 72 is positioned over the tow element 12 centered on the draft bar 16 of the rear hitch assembly 10R. The disabled vehicle 15 is then pulled away by towing vehicle 15′ and the movement of vehicle 15′ by its operator causes the towed vehicle 15 to follow along.

When towing is complete removal of the tow bar assembly 60 is simple and the two automobiles 15 and 15′ are disengaged.

As those skilled in the art will appreciate that the actual fixtures 10″ by which the distal end of each straight piece 62 and 64 attaches to the draft bar 16 may be any convenient means but that disclosed herein permits articulation between the ends of the draft bar 16 and the distal ends of the tow bar assembly; further this structure permits the hitch assembly 10 to be used, on the one hand, as a tow hitch, and on the other hand, in combination with the tow bar assembly, now disclosed, as a tow bar, that is, as means for pulling a vehicle.

The embodiments of the invention in which an exclusive property, or privilege is claimed are defined as follows:

1. A tow bar comprising a hitch and a tow bar assembly in combination:
  (a) the hitch adapted for attachment to a bumper of a motor vehicle, the hitch including a draft bar wherein the improvement comprises an extended draft bar having fixtures at either end, and hitch assemblies for mounting the draft bar near each of its ends to the vehicle bumper wherein the hitch assembly comprises:
    (i) a generally elongated U shaped member including an essentially flat spine adapted to rest in facing relationship against said bumper, and a pair of parallel arms extending from said spine in a direction away from said bumper, each of said arms having an aperture therethrough for receiving the ends of said draft bar;
    (ii) two adjacent finger members mounted at the upper regions of the U shaped member to define between them and the spine an open slit that extends from the spine toward the distal ends, said slit adapted to accept a link of a chain;
    (iii) a lever member having a first and a second end; means for pivotally attaching said first end to upper distal regions of said arms whereby said second end swings in a plane between said arms and parallel thereto from a lower position below and beyond the distal ends of said arms to an upper position above the upper edge of said spine; a depending member pivotally mounted on said lever member between said second end and said pivotally attaching means, said depending member having a slot therein;
    (iv) upper and lower chains, each chain having attachment means at one end adapted for respective engagement with the automobile, the upper chain adapted to have one link mate into the upper slit, the lower chain having one of its links adapted to enter into said slot whereby on movement of the lever member from its lowest to its upper position the lower chain is caused to be pulled tight and to enwrap the draft bar and to urge the draft bar toward the spine, and into binding engagement with segments of each arm which define in part the aperture.
  (b) the tow bar assembly including a first straight piece with distal and proximate ends, means on the distal ends for rigid attachment to one of said fixtures, a second straight piece with distal and proximate ends, and means for affixing the proximate ends of both straight pieces together and means on the distal end of the second straight piece for rigid attachment to said other fixture, and trailer hitch attachment means near the proximate ends adapted for attachment to another trailer hitch.

2. The tow bar as claimed in claim 1 wherein the lever member comprises means for changing the relative distance between the said one end of the lower chain and the pivotal mounting of the depending member on the lever.

3. The tow bar as claimed in claim 2 wherein the changing means of the hitch includes a threaded shaft having one end pivotally attached to the load, a mating securing socket for threadingly engaging said shaft, the socket defining said slot for accomodating a link of the lower chain.

4. The tow bar as claimed in claim 3 wherein the said socket includes a finger like member having two spacily disposed fingers which define therebetween the accomodating slot.

5. The tow bar as claimed in claim 1, 2 or 3 wherein the hitch includes a resilient surface, on the spine obverse to the arms.

6. The two bar as claimed in claim 1, 2 or 3 wherein the hitch includes an adjustment member with engaging surface, attached to the elongated U shaped member the engaging surface adapted to engage a lower facing surface of the bumper than that of the spine, thereby constraining the spine in an essentially vertical position relative to the bumper.

7. The tow bar as claimed in claim 1, 2 or 3 wherein the hitch includes a lower adjustment member having an engaging surface disposed in a plane non-coincident to that of the spine and on the obverse face from the arms, and means for attachment of said member to the lower regions of the arms proximate the spine.

8. The tow bar as claimed in claim 1, 2, or 3 wherein the hitch includes means for constraining the upper end of the lever into proximate relation with the upper margins of the spine, thereby constraining the pivotal connection of the depending member into a position superadjacent the pivotal attachment of the lever member to said arms.

9. The tow bar as claimed in claim 1 wherein the distal ends of the tow bar assembly have means for articulatable attachment to said fixtures.

* * * * *